US008429396B1

(12) United States Patent
Trivedi et al.

(10) Patent No.: US 8,429,396 B1
(45) Date of Patent: Apr. 23, 2013

(54) PEER DISCOVERY AND SECURE COMMUNICATION IN FAILOVER SCHEMES

(75) Inventors: Atul Narendra Trivedi, Santa Clara, CA (US); Steven Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1093 days.

(21) Appl. No.: 11/421,386

(22) Filed: May 31, 2006

(51) Int. Cl.
*H04L 29/00* (2006.01)
(52) U.S. Cl.
USPC .......................................... 713/150; 709/223
(58) Field of Classification Search .................. 709/223; 713/105, 150
See application file for complete search history.

(56) References Cited

U.S. PATENT DOCUMENTS

| | | | | |
|---|---|---|---|---|
| 6,055,575 A * | 4/2000 | Paulsen et al. | ................. | 709/229 |
| 6,401,120 B1 * | 6/2002 | Gamache et al. | ............. | 709/226 |
| 7,411,916 B2 * | 8/2008 | Sakov et al. | ................... | 370/252 |
| 7,526,549 B2 * | 4/2009 | Block et al. | .................... | 709/225 |
| 2003/0028777 A1 * | 2/2003 | Hennessey et al. | ........... | 713/176 |
| 2007/0211705 A1 * | 9/2007 | Sunstrum | ..................... | 370/356 |
| 2008/0112354 A1 * | 5/2008 | Toutonghi | ..................... | 370/328 |

OTHER PUBLICATIONS

Provisional U.S. Appl. No. 60/766,283, "Plug and Play Server-Less VoIP Telephone System", Sunstrum, file date Jan. 8, 2006.*
ICS Triplex ISaGRAF, Inc.; Redundancy and Failover Mechanism; www.icstriplexisagraf.com; Feb. 2004; pp. 1-6.
R. Hinden; Virtual Router Redundancy Protocol (VRRP); Network Working Group; Request for Comments: 3768; Apr. 2004; pp. 1-25.
Juniper Networks, Inc.; DX Application Acceleration Platform; Installation and Administration Guide for DXOS Version 5.0; Rev. 1.00, Oct. 10, 2005; pp. 113-154.

* cited by examiner

*Primary Examiner* — Jeffrey Pwu
*Assistant Examiner* — Helai Salehi
(74) *Attorney, Agent, or Firm* — Harrity & Harrity, LLP

(57) ABSTRACT

A system discovers peer nodes in a failover system, establishes a secure channel between at least two of the peer nodes, and exchanges state information over the secure channel.

28 Claims, 9 Drawing Sheets

PEER DISCOVERY AND SECURE COMMUNICATION IN FAILOVER SCHEMES

BACKGROUND

1. Field of the Invention

Implementations consistent with the principles of the invention relate generally to data communication and, more particularly, to peer discovery and secure communication in a failover scheme.

2. Description of Related Art

Fault-tolerance is a property of a system in which the system continues to operate properly in the event of failure of some of its parts. Duplication can provide fault-tolerance by, for example, providing multiple identical instances of the same system component and switching to one of the remaining instances in case of a failure.

In a fault-tolerant system, each system component may discover the presence of other components in the system. In one existing system, a component may transmit multicast messages to other components located in the same local network. This discovery technique, however, does not extend beyond the local network.

In a fault-tolerant system, each system component may exchange health information with other components in the system. In existing systems, the components exchange health information over unsecure communication channels. A problem that might arise, however, is that an attacker might insert poisoned health information into the system. The insertion of poisoned health information is a basic form of denial of service attack, where the poisoned health information might make it appear as if a component has failed or is otherwise unavailable (when in fact it is not).

SUMMARY

According to one aspect, a method may include discovering peer nodes in a failover system; establishing a secure channel between at least two of the peer nodes; and exchanging state information over the secure channel.

According to another aspect, a failover system may include means for discovering peer nodes in the failover system; means for establishing a secure channel between each pair of the peer nodes; and means for transmitting state information over the secure channels.

According to yet another aspect, a failover system may include first peer nodes and a second peer node. The second peer node may discover at least one of the first peer nodes, establish a secure channel between the second peer node and the at least one first peer node, receive state information over the secure channel, and determine whether a failover event has occurred based on the received state information.

According to a further aspect, a system may include first peer nodes and a second peer node. The second peer node may send a broadcast discovery message to dynamically discover a local one of the first peer nodes, where the local peer node connects to the second peer node via a local network. The second peer node may send a unicast discovery message to statically discover a remote one of the first peer nodes, where the remote peer node connects to the second peer node via a wide area network. The second peer node may also receive state information from the local peer node and the remote peer node.

According to another aspect, a method may include sending, by a first peer node, a broadcast discovery message to discover a local peer node, where the local peer node connects to the first peer node via a local network; sending, by the first peer node, a unicast discovery message to discover a remote peer node, where the remote peer node connects to the first peer node via a wide area network; receiving state information from the local peer node and the remote peer node; and determining whether a failover event has occurred based on the received state information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention provide a technique for providing secure communication of state information in a failover system, including the discovery of peer nodes and the negotiation of a secure form of communication between the peer nodes.

Exemplary Network

Figure 1:
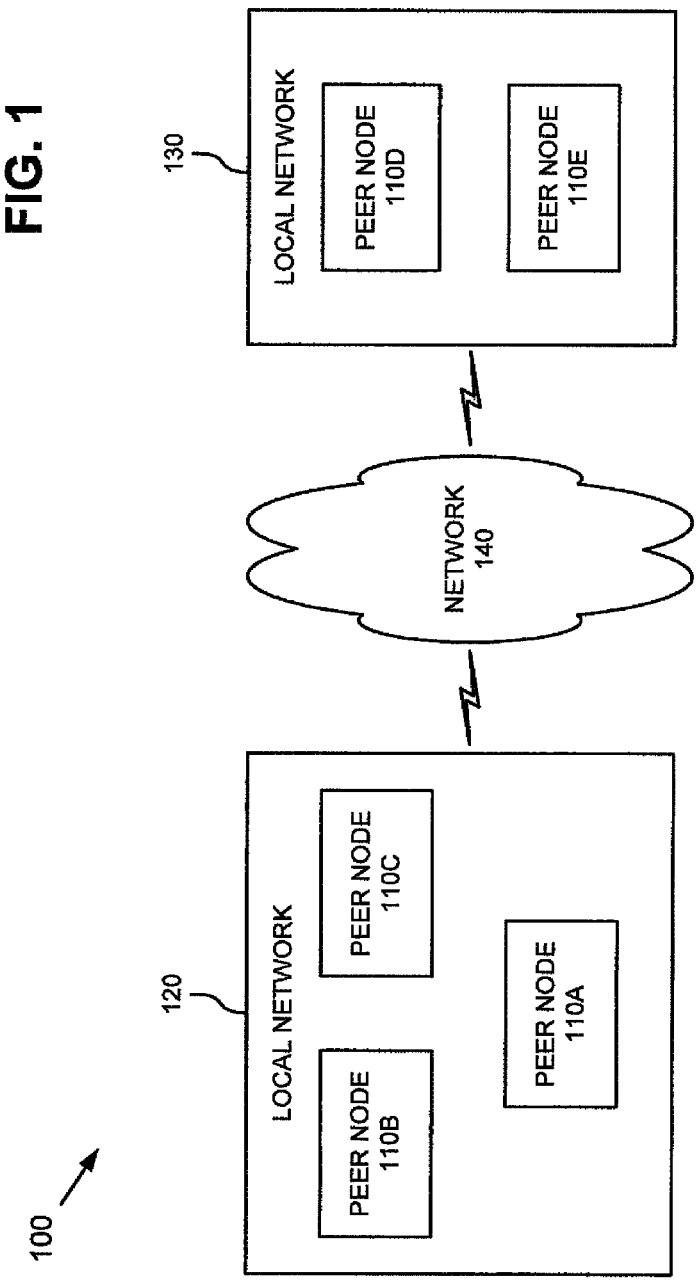
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include peer nodes 110A, 110B, . . . , 110E (collectively referred to as peer nodes 110). Peer nodes 110A, 110B, and 110C may connect together via a local network 120. Peer nodes 110D and 110E may connect together via a local network 130. Peer nodes 110A-110C may connect to peer nodes 110D-110E via network 140. Local networks 120 and 130 may include local area networks (LANs). Network 140 may include a wide area network (WAN). While a particular number and arrangement of peer nodes 110 and networks 120-140 are shown in FIG. 1, in practice, there may be more or fewer peer nodes 110 and/or networks 120-140.

Peer nodes 110 may include any set of similar network devices. Examples of peer nodes 110 may include routers, firewalls, data center accelerators, load balancers, global server load balancers, etc.

Figure 2:
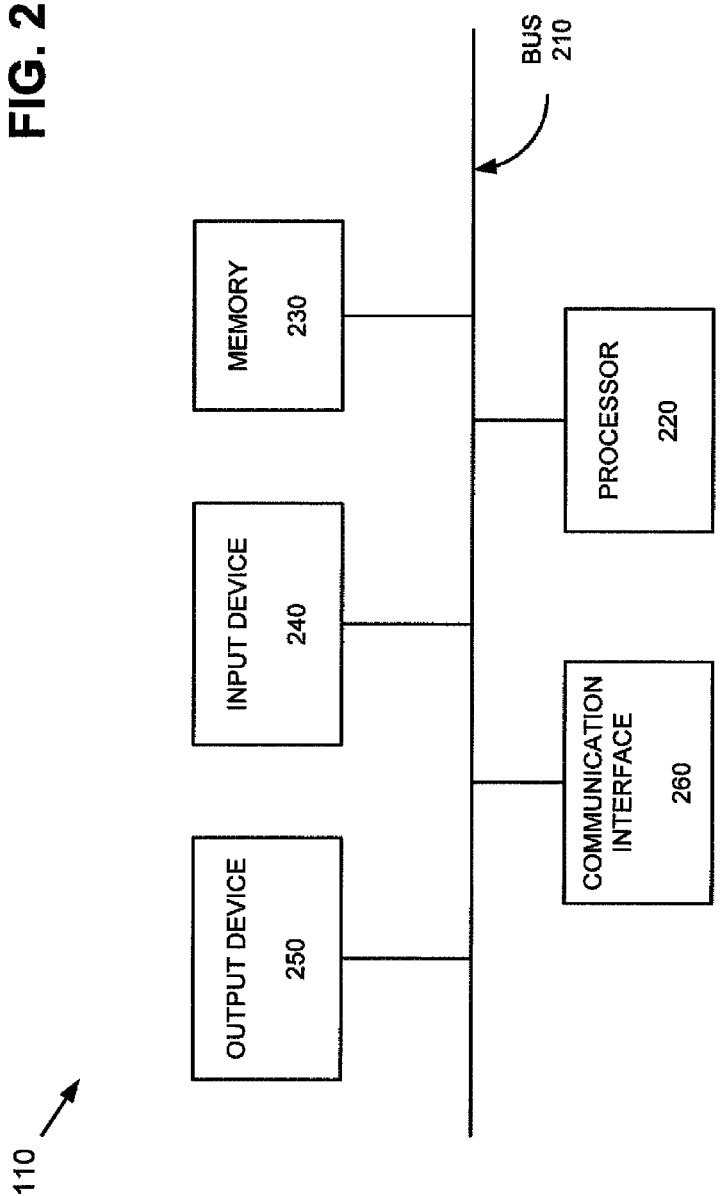
FIG. 2 is an exemplary block diagram of a peer node of FIG. 1.
Figure 3:
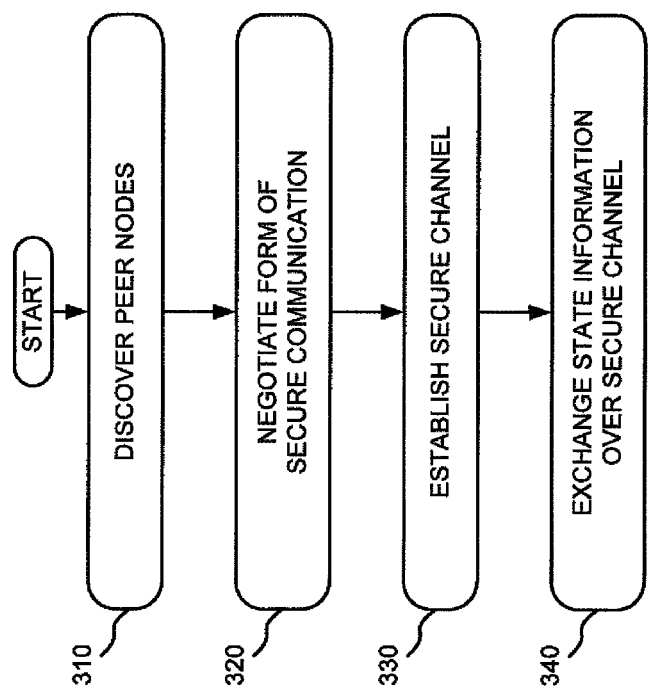
FIGS. 3-6 are flowcharts of exemplary processing for discovering peer nodes and exchanging state information over secure communication channels.

FIG. 2 is an exemplary diagram of a peer node 110. Peer node 110 may include a bus 210, a processor 220, a memory 230, an input device 240, an output device 250, and a communication interface 260. Bus 210 may include a path that permits communication among the elements of peer node 110.

Processor 220 may include a processor, microprocessor, or processing logic that may interpret and execute instructions. Memory 230 may include a random access memory (RAM)

or another type of dynamic storage device that may store information and instructions for execution by processor 220; a read only memory (ROM) device or another type of static storage device that may store static information and instructions for use by processor 220; and/or a magnetic and/or optical recording medium and its corresponding drive.

Input device 240 may include a mechanism that permits an operator to input information to peer node 110, such as a keyboard, a mouse, a pen, voice recognition and/or biometric mechanisms, etc. Output device 250 may include a mechanism that outputs information to the operator, including a display, a printer, a speaker, etc. Communication interface 260 may include any transceiver-like mechanism that enables peer node 110 to communicate with other devices and/or systems.

Peer node 110, consistent with the principles of the invention, may perform certain operations, as described in detail below. Peer node 110 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3-6 are flowcharts of exemplary processing for discovering peer nodes and exchanging state information over secure communication channels. The processing described with regard to FIGS. 3-6 will be described in terms of a single peer node within a failover system that may be implemented within a network, such as exemplary network 100 of FIG. 1. It should be understood that this processing may also be performed by some or all of the peer nodes in the failover system.

Processing may begin with a peer node (e.g., peer node 110A) discovering other peer nodes 110 in the failover system (block 310). In the failover system, each peer node tracks the state of each of the other peer nodes participating in the failover system. The peer nodes may use this state information to determine when a failover event has occurred. A "failover event," as used herein, may include any condition or trigger that may cause a failover to occur or indicate that a failover needs to occur, such as a node becoming inactive (e.g., a node failing or otherwise becoming unresponsive or unreachable).

Peer node 110A may use a hybrid discovery technique that includes a first technique for discovering local peer nodes 110 (i.e., peer nodes 110 that connect to peer node 110A via a local network (e.g., local network 120)) and a second technique for discovering remote peer nodes 110 (i.e., peer nodes 110 that connect to peer node 110A remotely, such as via a wide area network (e.g., network 140)).

Figure 4:
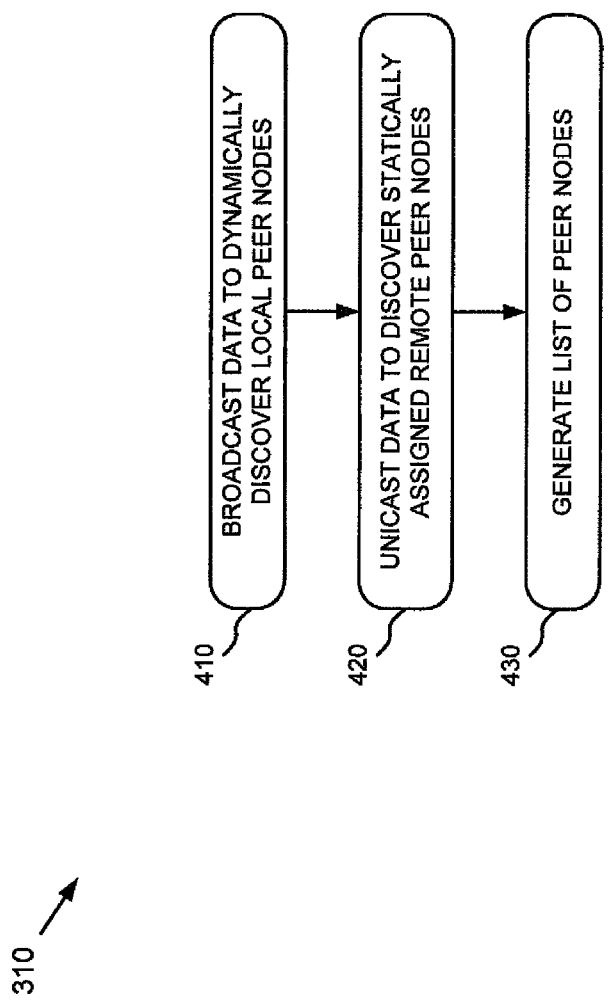

FIG. 4 is a flowchart of exemplary processing for discovering peer nodes 110. Data may be broadcast by a peer node to dynamically discover peer nodes that connect to the same local network (block 410). In one implementation, peer node 110A may broadcast data to a predetermined port. The data may, for example, take the form of a discovery message and identify the peer node from which the discovery message originated (i.e., peer node 110A). The other peer nodes 110 in the same local network 120 (e.g., peer nodes 110B and 110C) may continuously or periodically monitor data received at the predetermined port. When a peer node 110B/110C receives the broadcast data at the predetermined port, peer node 110B/110C may send data, such as a response, back to peer node 110A.

Data may be unicast by a peer node to discover statically assigned remote peer nodes (block 420). This discovery of statically assigned remote peer nodes may be referred to generally herein as "statically discovering the remote peer nodes." In one implementation, a system administrator may provide information to peer node 110A regarding peer node(s) 110 on remote networks (e.g., local network 130) that are part of the failover system. Peer node 110A may then send unicast data to each of these remote peer nodes 110. The data may, for example, take the form of a discovery message and identify the peer node from which the discovery message originated (i.e., peer node 110A). When a remote peer node 110D/110E receives the unicast data, peer node 110D/110E may send data, such as a response, back to peer node 110A.

A list of peer nodes may be generated based on the dynamically discovered local peer nodes and the statically discovered remote peer nodes (block 430). For example, peer node 110A may, as or after it discovers new peer nodes 110, add the peer nodes to a list of peer nodes. The list of peer nodes may include all (or a subset) of the other peer nodes in the failover system.

Returning to FIG. 3, a form of secure communication may be negotiated (block 320). For example, peer node 110A may negotiate with each peer node 110 on its list of peer nodes to identify a form of secure communication that it may use to communicate state information.

Figure 5:
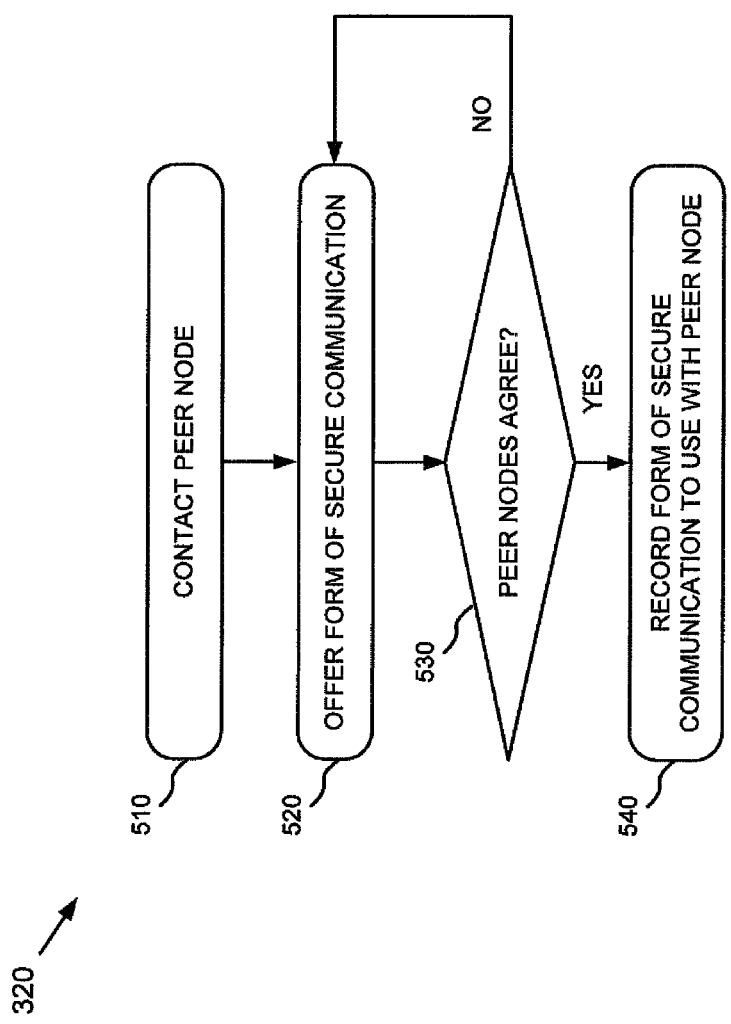

FIG. 5 is a flowchart of exemplary processing for negotiating a form of secure communication between peer nodes 110. A peer node may be contacted and a form of secure communication may be offered (blocks 510 and 520). For example, peer node 110A may contact a peer node on its list of peer nodes and suggest that they use a particular form of secure communication. In one implementation, a peer node 110 may maintain a list of forms of secure communication that it supports, such as the secure sockets layer (SSL) or transport layer security (TLS) protocol, symmetric ciphers and keys, or other forms of secure communication.

If the contacted peer node does not support the offered form of secure communication, the contacted peer node may indicate that it does not support that form of secure communication (block 530—NO). In this case, another form of secure communication may be offered to the contacted peer node (block 520). In one implementation, peer node 110A may first offer its most secure form of communication and if that form of secure communication is not supported by the contacted peer node, then peer node 110A may offer its next most secure form of communication, and so on. In another implementation, peer node 110A may first offer its preferred form of secure communication (which may or may not be the most secure form of communication that peer node 110A supports) and if that form of secure communication is not supported by the contacted peer node, then peer node 110A may offer another form of secure communication, and so on.

Alternatively, if the offered form of secure communication is not supported by the contacted peer node (block 530—NO), then the contacted peer node may offer a secure form of communication back to peer node 110A. In this case, the contacted peer node may continue to offer forms of secure communication to peer node 110A until an agreement is reached. Alternatively, the peer nodes might alternate the offering of forms of secure communication until an agreement is reached.

Alternative techniques for negotiating a form of secure communication are possible. For example, peer node 110A may send a list of the forms of secure communication that it supports to the contacted peer node. The contacted peer node may then select one of the forms of secure communication from the list that it supports.

In any event, this negotiation of forms of secure communication may continue until both peer nodes agree on a form of secure communication. It may be possible that the peer nodes cannot agree on a form of secure communication, such as in the case where the peer nodes do not support any of the same forms of secure communication. In this case, the peer nodes may agree to use an unsecure form of communication.

Once the peer nodes agree on a form of secure communication (block 530—YES), the particular form of secure communication to use for communication with the peer node may be recorded (block 540). For example, peer node 110A may maintain a table of the forms of secure communication to use with the peer nodes in its list of peer nodes.

Returning to FIG. 3, once the form of secure communication is successfully negotiated, a secure channel may be established between the peer nodes (block 330). For example, peer node 110A may establish a secure channel to each of the peer nodes 110 in its list of peer nodes based upon the agreed-upon form of secure communication.

State information may then be exchanged between the peer nodes over the secure channel (block 340). In one implementation, the state information may include any data that helps in the operation of the failover system. Examples of state information might include failover statistics, configuration information, heartbeat signals, the amount of free memory, the amount of processor resources being used, the number of connections being used to a back end device, the number of connections being used to a client, response times, trace route information, ping times, ping latencies, and/or other types of information that might be useful in determining when a failover event has occurred. Alternatively, or additionally, the state information might include information regarding a service supported by a peer node. When the failover system includes peer nodes that support different services, the state information may be useful in segregating the peer nodes based on the service(s) that the peer nodes support.

Figure 6:
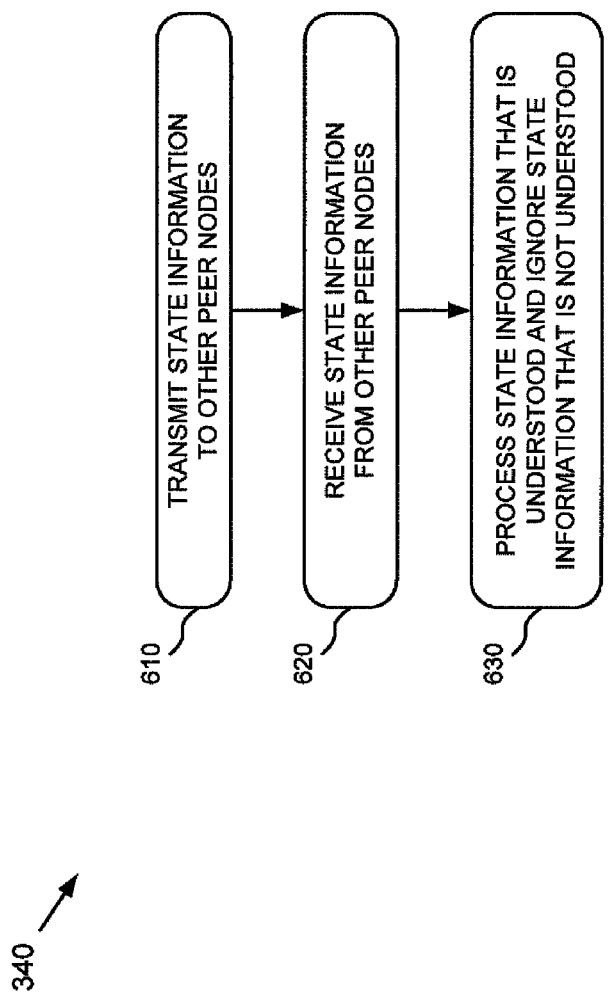

FIG. 6 is a flowchart of exemplary processing for exchanging state information between peer nodes 110. State information may be transmitted to other peer nodes (block 610). For example, peer node 110A may periodically transmit state information to all (or a subset) of the peer nodes on its list of peer nodes. The transmission of the state information may occur on a regular, or irregular, basis.

State information may be received from other peer nodes (block 620). For example, peer node 110A may receive state information from all (or a subset) of the peer nodes on its list of peer nodes. The reception of the state information may occur on a regular, or irregular, basis. If no state information is received from a peer node within a predetermined time period, then that peer node may be identified as unreachable.

State information that is understood may be processed and state information that is not understood may be ignored (block 630). The state information in the failover system may be fully extensible without making it incompatible with older implementations. For example, some peer nodes within the failover system may include software/hardware that support additional and/or different forms of state information from other peer nodes within the failover system. Updating the software/hardware associated with the peer nodes in the failover system may take time. Therefore, at any point in time, there may be different versions of software/hardware in some of the peer nodes. By configuring the peer nodes to process only that state information that they understand and ignore the state information that they do not understand, the failover system may continue to operate seamlessly even though the peer nodes contain different versions of software/hardware.

In this case, peer node 110A may receive state information from the peer nodes in its list of peer nodes. The state information from one of the peer nodes may include more, fewer, or different pieces of data than the state information received from another one of the peer nodes. Peer node 110A may ignore any state information that it does not understand. Peer node 110A may process the state information that it understands to determine the state (or health) of the corresponding peer node. This state determination may facilitate a determination of whether a failover event has occurred within the failover system. If a failover event has occurred, appropriate action may be taken.

Example

Figure 7:
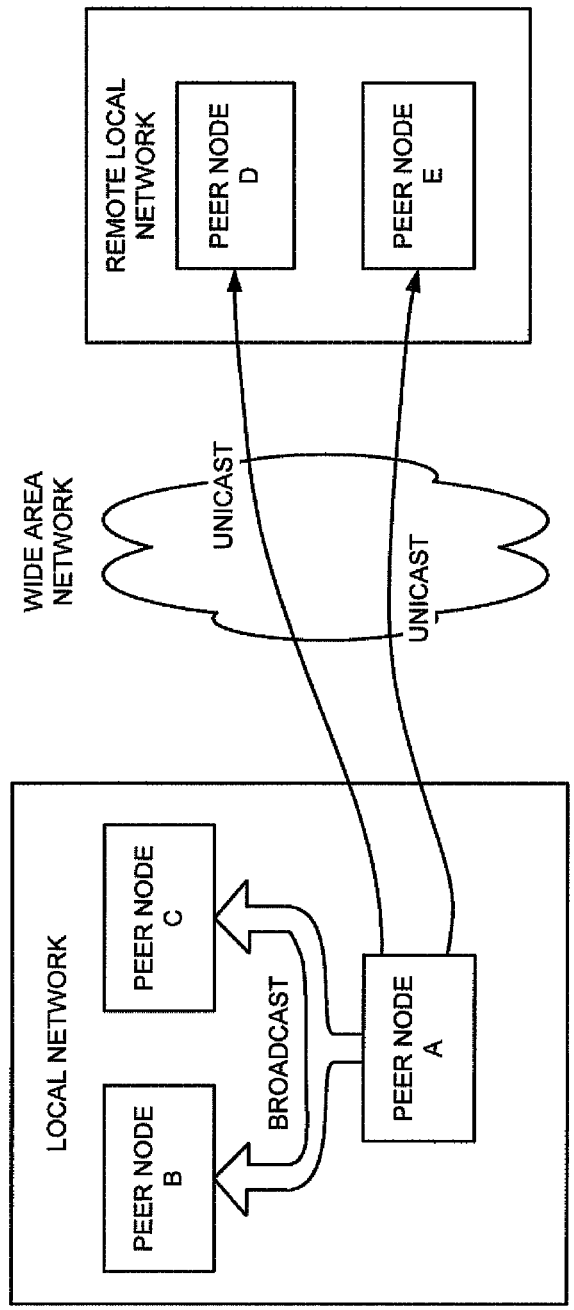
FIGS. 7-9 are diagrams illustrating an exemplary implementation consistent with the principles of the invention.
Figure 8:
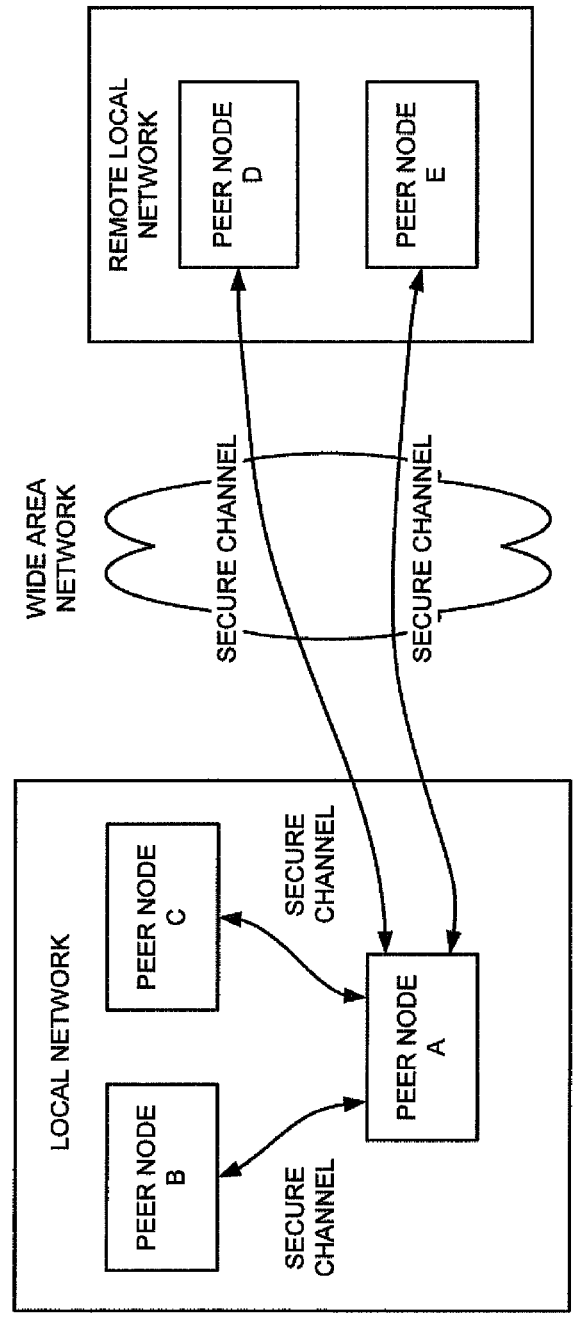
Figure 9:
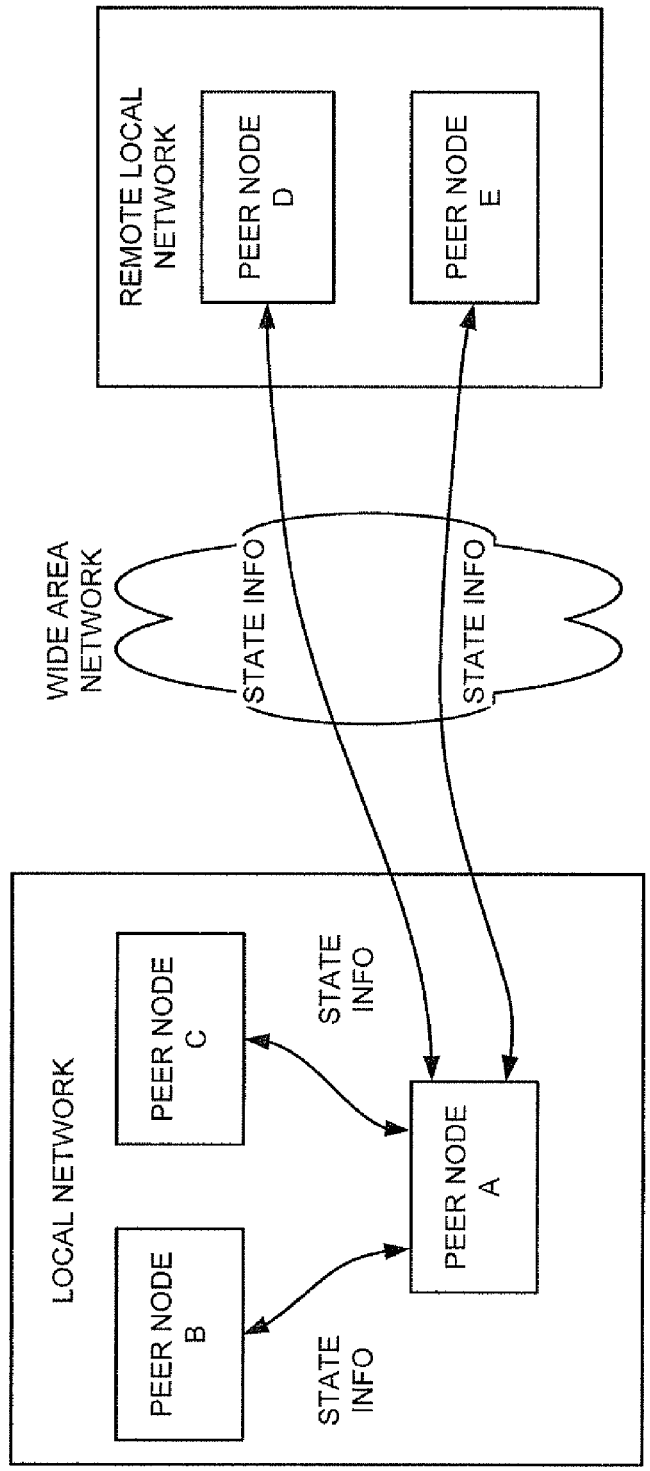

FIGS. 7-9 are diagrams illustrating an exemplary implementation consistent with the principles of the invention. The processing described with regard to FIGS. 7-9 will be described in terms of a single peer node within a failover system. It should be understood that this processing may also be performed by some or all of the peer nodes in the failover system.

As shown in FIG. 7, peer node A may broadcast a discovery message to local peer nodes within the same local network, such as peer nodes B and C, to dynamically discover the identity of local peer nodes within the local network. These local peer nodes may respond to the discovery message with a response message. As further shown in FIG. 7, peer node A may send unicast discovery messages to remote peer nodes, such as peer nodes D and E, to statically discover the identity of remotely-connected peer nodes. These remote peer nodes may respond to the discovery message with a response message. Peer node A may generate a list of peer nodes based on the response messages received from the local and remote peer nodes.

Once the local and remote peer nodes have been discovered, peer node A may negotiate establishment of a secure channel with the peer nodes in its list of peer nodes, as shown in FIG. 8. Peer node A may contact each of the local and remote peer nodes and negotiate with each of them a form of secure communication to use for the secure channel. The negotiation may include the offer and eventual acceptance of a form of secure communication that is supported by both peer nodes. The secure channel between each of the peer nodes may help prevent the poisoning of the state information, which is a basic form of a denial of service attack.

Peer node A may then exchange state information with the peer nodes in its list of peer nodes over the secure channels that have been established, as shown in FIG. 9. As explained above, the state information received from the peer nodes may differ based on the possibly different versions of software/hardware implemented within the peer nodes. Assume that the state information from peer node B includes state metric 1, state metric 2, and state metric 3, and that the state information from peer node E includes state metric 1, state metric 2, state metric 6, and state metric 10. Assume further that peer node A is currently configured to process only state metrics 1-8. In this case, peer node A may process the state metrics 1-3 from peer node B to determine the state (or health) of peer node B. Peer node A may process the state metrics 1, 2, and 6, and ignore state metric 10, to determine the state (or health) of peer node E. Peer node A may use the determined state of peer nodes B and E to determine when a failover event has occurred in the failover system. If a failover event occurs, appropriate action may be taken. For example, one or more of the peer nodes may take over operation for another peer node so that the failover system can continue to operate seamlessly.

CONCLUSION

Implementations consistent with the principles of the invention may provide a technique for providing secure communication of state information in a failover system, including the discovery of peer nodes and the negotiation of a secure form of communication between the peer nodes. The secure communication of the state information helps protect the failover system from attacks, such as an attacker poisoning the state information to make it appear that a peer node in the failover system has failed.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3-6, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

Also, it has been described that data may be broadcast to dynamically discover local peer nodes, and unicast to statically discover remote peer nodes. In an alternate implementation, data may transmitted using a different technique, such as multicasting, to discover local and/or remote peer nodes. For example, data may be broadcast, multicast, and/or unicast to discover local peer nodes. Similarly, data may be multicast and/or unicast to discover remote peer nodes.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a peer node, of a plurality of peer nodes, in a network, the method comprising:
    performing, by the peer node, a first discovery technique for discovering local peer nodes, of the plurality of peer nodes, the first discovery technique including sending a broadcast discovery message, via a local area network, to dynamically discover the local peer nodes;
    performing, by the peer node, a second discovery technique for discovering remote peer nodes, of the plurality of peer nodes, the second discovery technique being different from the first discovery technique and including sending a unicast discovery message, via a wide area network, to statically discover the remote peer nodes;
    negotiating, by the peer node, a secure channel for exchanging state information, the peer node negotiating the secure channel with each of the local peer nodes and each of the remote peer nodes, negotiating the channel with one of the local peer nodes or one of the remote peer nodes including:
        offering, by the peer node and to the one of the local peer nodes or the one of the remote peer nodes one or more forms of secure communication to be used to exchange the state information, and
        determining, by the peer node, whether the peer node and the one of the local peer nodes or the one of the remote peer nodes support a common form of secure communication based on offering the one or more forms of secure communication,
    establishing, by the peer node, the secure channel using the common form of secure communication when the peer node and the one of the local peer nodes or the one of the remote peer nodes support the common form of secure communication,
    establishing, by the peer node, an unsecure channel between the peer node and the one of the local peer nodes or the one of the remote peer nodes when the peer node and the one of the local peer nodes or the one of the remote peer nodes do not support the common form of secure communication; and
    exchanging the state information over the secure channel or the unsecure channel.

2. The method of claim 1, where the peer node connects to the local peer nodes via the local area network, and
    where the peer node connects to the remote peer nodes via the wide area network.

3. The method of claim 1, where performing the first discovery technique includes:
    receiving, via the local area network, responses to the broadcast discovery message from the local peer nodes.

4. The method of claim 1, where performing the second discovery technique includes:
    receiving, via the wide area network, a response to the unicast discovery message from the remote peer nodes.

5. The method of claim 1, where performing the second discovery technique further includes:
    receiving, from an administrator, information associated with an identity of the remote peer nodes, and
    where sending the unicast discovery message includes sending the unicast discovery to the remote peer nodes using the information associated with the identity of the remote peer nodes.

6. The method of claim 1, further comprising:
    generating a list of peer nodes, of the plurality of peer nodes, discovered using the first discovery technique and the second discovery technique, and
    where negotiating the secure channel for exchanging state information is based on the list of peer nodes.

7. The method of claim 1, where, for each local peer node, of the local peer nodes, and for each remote peer node, of the remote peer nodes, negotiating the secure channel includes:
    contacting the local peer node or the remote peer node, as a contacted peer node,
    negotiating with the contacted peer node, to determine whether the contacted peer node and the peer node support the common form of secure information for exchanging the state information, and establishing the secure channel when the contacted peer node and the peer node support the common form of secure communication.

8. The method of claim 1, where offering the one or more forms of secure communication includes:

offering, by the peer node, a first form of secure communication to be used to exchange the state information, receiving, by the peer node, a response to the offer of the first form of secure communication, and receiving, by the peer node, an offer to use a second form of secure communication when the response indicates that the one of the local peer nodes or the one of the remote peer nodes does not support the first form of secure communication.

9. The method of claim 1, where exchanging the state information includes:

transmitting first state information to at least one of the local peer nodes or at least one of the remote peer nodes, and receiving second state information from the at least one of the local peer nodes or the at least one of the remote peer nodes;

where the method further includes:

determining a state of the at least one of the local peer nodes or the at least one of the remote peer nodes based on the second state information; and determining whether a failover event has occurred based on the determined state.

10. The method of claim 7, where negotiating with the contacted peer node includes:

offering, to the contacted peer node, one or more forms of secure communication to be used to exchange the state information until an agreement is reached with the contacted peer node.

11. The method of claim 9, further comprising:

processing a first portion of the second state information, where the first portion of the second state information comprises state information that is recognized by the peer node; and ignoring a second portion of the second state information, where the second portion of the second state information comprises state information that is not recognized by the peer node.

12. The method of claim 11, where determining the state of the at least one of the local peer nodes or the at least one of the remote peer nodes is based on the first portion of the second state information.

13. A system comprising:

one or more devices to:

discover a first peer node, of a plurality of peer nodes, using a first discovery technique, of a plurality of discovery techniques, where the first discovery technique includes sending a broadcast discovery message to discover the first peer node on a local network, discover a second peer node, of the plurality of peer nodes, using a second discovery technique, of the plurality of discovery techniques, where the second discovery technique includes sending a unicast discovery message to discover the second peer node on a remote network, where the second peer node is different from the first peer node, negotiate with the first peer node to identify a first form of secure communication, when negotiating with the first peer node, the one or more devices begin to:

offer one or more forms of secure communication to the first peer node, and determine, based on offering the one or more forms of secure communication, whether the one or more devices and the first peer node support a common form of secure communication, negotiate with the second peer node to identify a second form of secure communication, establish, via the local area network, a first secure channel with the first peer node when the one or more devices support the common form of communication, establish, via the local area network, an unsecure channel between the one or more devices and the first peer node when the one or more devices and the first peer node do not support the common form of communication, establish, via the remote network, a second secure channel with the second peer node based on the identified second form of communication, and transmit state information over the first secure channel or the unsecure channel to the first peer node and over the second secure channel to the second peer node.

14. A failover system, comprising:

a plurality of first peer nodes; and a second peer node to:

discover one of the plurality of first peer nodes by sending a broadcast discovery message to the one of the plurality of first peer nodes via a first network, discover another one of the plurality of first peer nodes by sending a unicast discovery message to the other one of the plurality of first peer nodes via a second network that is different from the first network, negotiate a form of secure communication with the one of the plurality of first peer nodes and the other one of the plurality of first peer nodes, when negotiating the form of secure communication, the second peer node begin to:

offer one or more forms of secure communication to the one of the plurality of first peer nodes, and determine, based on offering the one or more forms of secure communication, whether the second peer node and the one of the plurality of first peer nodes support a common form of secure communication, establish a first secure channel between the second peer node and the one of the plurality of first peer nodes when the second peer node and the one of the plurality of first peer nodes support the common form of secure communication, establish an unsecure channel between the second peer node and the one of the plurality of first peer nodes when the second peer node and the one of the plurality of first peer nodes do not support the common form of secure communication, establish a second secure channel between the second peer node and the other one of the plurality of first peer nodes, receive state information over the first secure channel or the unsecure channel from the one of the plurality of first peer nodes and over the second secure channel from the other one of the plurality of first peer nodes, and determine whether a failover event has occurred based on the received state information.

15. The system of claim 14, where, when discovering the one of the plurality of first peer nodes, the second peer node is to:

send the broadcast discovery message to dynamically discover the one of the plurality of first peer nodes, and receive a response to the broadcast discovery message from the one of the plurality of first peer nodes, where the second peer node dynamically discovers the one of the plurality of first peer nodes based on receiving the response to the broadcast discovery message.

16. The system of claim 14, where, when discovering the other one of the plurality of first peer nodes, the second peer node is to:

send the unicast discovery message to statically discover the other one of the plurality of first peer nodes, and receive a response to the unicast discovery message from the other one of the plurality of first peer nodes, where the second peer node statically discovers the other one of the plurality of first peer nodes based on receiving the response to the unicast discovery message.

17. The system of claim 14, where, when discovering the other one of the plurality of first peer nodes, the second peer node is further to:

receive, from an administrator, information associated with an identity of the other one of the plurality of first peer nodes, and where, when sending the unicast discovery message, the second peer node is to send the unicast discovery message to the other one of the plurality of first peer nodes using the identity of the other one of the plurality of first peer nodes.

18. The system of claim 14, where the second peer node is further to:

generate a list of first peer nodes, of the plurality of first peer nodes, discovered by sending the broadcast discovery message and the unicast discovery message, and negotiate, based on the list of first peer nodes, a form of secure communication with each of the first peer nodes included in the list of first peer nodes.

19. The system of claim 14, where, when offering the one or more forms of secure communication, the second peer node is to:

offer, to the one of the plurality of first peer nodes, a first form of secure communication to be used for the first secure channel, receive, from the one of the plurality of first peer nodes, a response to the offer of the first form of secure communication, and offer, to the one of the plurality of first peer nodes, a second form of secure communication to be used for the first secure channel when the response to the offer of the first form of secure communication indicates that the one of the first plurality of peer nodes does not support the first form of secure communication.

20. The system of claim 14, where, when negotiating the form of secure communication with the other one of the plurality of first peer nodes, the second peer node is to offer, to the other one of the plurality of first peer nodes, one or more forms of secure communication to be used for the second secure channel, where the second peer node offers the one or more forms of secure communications until an agreement is reached with the other one of the plurality of first peer nodes.

21. The system of claim 14, where the second peer node is further to:

process a first portion of the state information, where the first portion of the state information comprises state information that is recognized by the second peer node, and ignore a second portion of the state information, where the second portion of the state information comprises state information that is not recognized by the second peer node.

22. The system of claim 21, where, when determining whether the failover event has occurred, the second peer node is to:

determine whether the failover event has occurred based on the processed first portion of the state information.

23. A system, comprising:

a first peer node to:

send a broadcast discovery message to dynamically discover a local peer node, of a plurality of second peer nodes, where the local peer node connects to the first peer node via a local area network, send a unicast discovery message to statically discover a remote peer node, of the plurality of second peer nodes, where the remote peer node connects to the first peer node via a wide area network, negotiate a form of secure communication with the local peer node and the remote peer node, when negotiating the form of secure communication with one of the local peer node or the remote peer node, the first peer node begin to:

offer one or more forms of secure communication to the one of the local peer node or the remote peer node, and determine, based on offering the one or more forms of secure communication to the one of the local peer node or the remote peer node, whether the first peer node and the one of the local peer node or the remote peer node support a common form of secure communication, establish separate communication channels to the local peer node and the remote peer node, at least one of the channels comprising an unsecure channel when the first peer node and the one of the local peer node or the remote peer node do not support the common form of communication, and receive state information from the local peer node and the remote peer node via the separate communication channels.

24. The system of claim 23, where, when establishing the separate communication channels, the first peer node is to:

establish a first secure channel between the first peer node and the local peer node, and establish a second secure channel between the first peer node and the remote peer node, where at least one of the first secure channel or the second secure channel use the common form of secure communication.

25. The system of claim 23, where the first peer node is to determine whether a failover event has occurred based on the state information received from the local peer node or the state information received from the remote peer node.

26. The system of claim 23, where the first peer node is further to:

send another unicast discovery message to statically discover another local peer node, of the plurality of second peer nodes, where the other local peer node connects to the first peer node via the local area network.

27. The system of claim 24, where, when receiving the state information, the first peer node is to:

receive the state information from the local peer node over the first secure channel, and receive the state information from the remote peer node over the second secure channel.

28. A method, comprising:
sending, by a first peer node, a broadcast discovery message to discover a local peer node, the local peer node connecting to the first peer node via a local area network;
sending, by the first peer node, a unicast discovery message to discover a remote peer node, the remote peer node connecting to the first peer node via a wide area network;
negotiating a form of secure communication with the local peer node and the remote peer node, negotiating the form of secure communication with one of the local peer node or the remote peer node including:
  offering one or more forms of secure communication to the one of the local peer node or the remote peer node, and
  determining, based on offering the one or more forms of secure communication to the one of the local peer node or the remote peer node, whether the first peer node and the one of the local peer node or the remote peer node support a common form of secure communication,
establishing, by the first peer node, channels to the local peer node and the remote peer node, at least one of the channels comprising an unsecure channel when the first peer node and the one of the local peer node or the remote peer node do not support the common form of communication;
receiving, by the first peer node, state information from the local peer node and the remote peer node via the established channels; and
determining whether a failover event has occurred based on the received state information.

\* \* \* \* \*

UNITED STATES PATENT AND TRADEMARK OFFICE
CERTIFICATE OF CORRECTION

PATENT NO. : 8,429,396 B1
APPLICATION NO. : 11/421386
DATED : April 23, 2013
INVENTOR(S) : Atul Narendra Trivedi et al.

It is certified that error appears in the above-identified patent and that said Letters Patent is hereby corrected as shown below:

In the Claims:

Column 10, claim 14, line 37 should read: "being to:"
Column 12, claim 23, line 25 should read: "node being to:"

Signed and Sealed this
Eighteenth Day of June, 2013

Teresa Stanek Rea
*Acting Director of the United States Patent and Trademark Office*